Feb. 4, 1969　　　P. J. GAUGHAN ET AL　　　3,425,952
APPARATUS FOR THE CONTROL OF FOAM FORMATION
DURING THE PROCESSING OF LIQUIDS
Filed Jan. 10, 1967
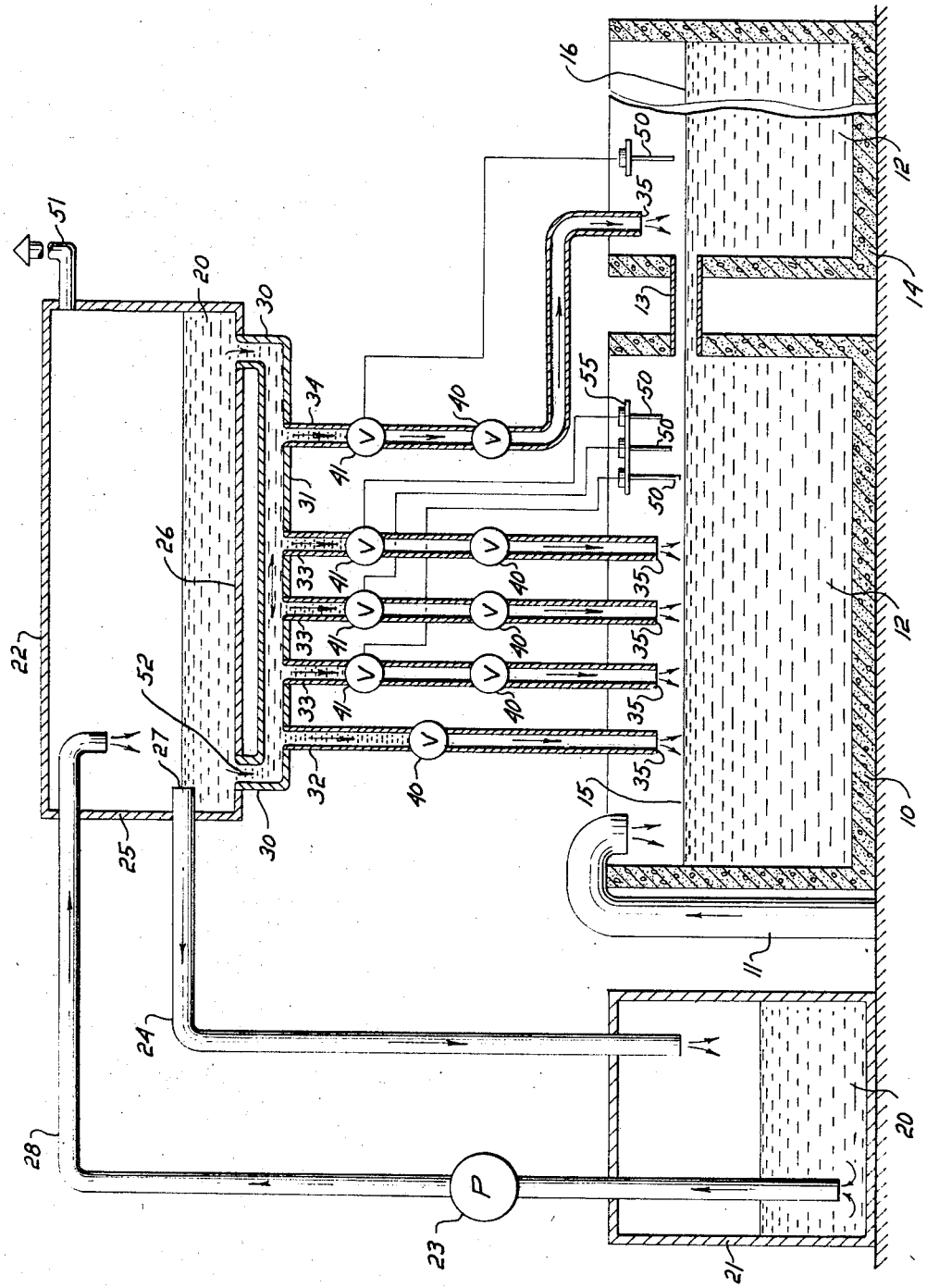
INVENTORS
Philip J. Gaughan
George E. Dorwart
John B. Lord
William J. Holcomb
ATTORNEY United States Patent Office 3,425,952
Patented Feb. 4, 1969

3,425,952
APPARATUS FOR THE CONTROL OF FOAM FORMATION DURING THE PROCESSING OF LIQUIDS
Philip J. Gaughan, Philadelphia, George E. Dorwart III, Southampton, and John B. Lord, Abington, Pa., assignors to Betz Laboratories, Inc., Philadelphia, Pa., a corporation of Pennsylvania
Continuation-in-part of application Ser. No. 539,085, Mar. 31, 1966. This application Jan. 10, 1967, Ser. No. 608,354
U.S. Cl. 252—361
Int. Cl. B01d 19/04
8 Claims

ABSTRACT OF THE DISCLOSURE

The present invention relates generally to the control of foam formation in the processing of liquids and to apparatus therefor, and particularly to feeding anti-foam agents to wet processes for the synthesis of phosphoric acid by means of an anti-foam distribution system. The anti-foam distribution system features (1) a plurality of valves through which the anti-foam agents pass, which valves operate in response to a plurality of sensing means located at gradually increased heights from the surface of the liquid being processed, and (2) a holding receptacle located at an elevation above the surface of the liquid being treated, said holding receptacle being connected to a plurality of feeders having valves therein, and making possible gravity flow of anti-foam agent.

---

The present application is a continuation in part of copending application Ser. No. 539,085 which was filed on Mar. 31, 1966.

In the processing of liquids such as reaction mediums, coatings and liquid systems employed in conveying solid media, e.g. the aqueous systems employed to convey pulp, paper and digestion media in the manufacture of paper and pulp, the occurrence of foam is a commonly encountered and troublesome phenomenon. For example, foam may reduce the useful capacity of the receptacles, vessels or conduits which contain or convey the process liquid, may plug or impair the operation of elements of the process equipment such as pumps, valves, filters, etc., may necessitate operational shut-downs for the purpose of cleaning up overflows, and may yield defects in the final product derived from the process, e.g. voids in paper, bubbles in coatings, etc.

Such problems are particularly pronounced in the synthesis of phosphoric acid by techniques commonly referred to as "wet processes." In such processes, phosphate rock is added to a strong mineral acid, e.g. sulfuric, hydrochloric, nitric acid, etc., and reacted or digested to yield phosphoric acid and metal salts which are ultimately removed. The economical operation of commercial methods for wet process phosphoric acid synthesis involve large treating receptacles and a relatively high throughput rate. Conventionally, the reaction is initiated in a reaction vessel or digestor and the resultant reaction medium is successively passed through a series of digestors and vessels in which the further reaction and concentration of the reaction medium, and the refining of the phosphoric acid, are achieved. Such methods are accompanied by excessive foam formation which yields problems in the form of deposit formed on the processing equipment, and hazards to operating personnel when foam formation results in overflow from the processing vessels. The formation of deposits in the processing equipment reduces the overall capacity of the equipment, impedes flow through conduits, valves, filters, etc., and impairs heat transfer in process phases involving the heating or cooling of the reaction medium.

A variety of antifoam agents are employed in combatting foam occurrence and include tall oil, kerosene, complex amides, silicones, etc. All of these treatments involve appreciable expense and such expense is particularly repugnant in that it does not directly contribute to the value of the product which is finally yielded by the process. Like all processing aids, their impact upon the final product is intangible to the purchaser and their benefits are limited to negative or preventitive factors such as the acceleration of processing by preventing slow ups occasioned by foam formation, and preventing product defects which would otherwise result from foam formation. The economics of the use of antifoam agents is further impaired by the fact that foam occurrence is normally not uniform or readily predictable, and the quantity of antifoam agent employed must be constantly varied in relation to the surges and recessions of foam occurrence. For example, accelerated processing or increased throughput rates commonly result in increased foam formation. Similarly, minor variations in process conditions, as well as minor deviations in the chemical or physical characteristics of the constituents of the process fluid frequently yield disproportionate effects in respect to foam formation. In the processing of aqueous pulp and paper systems relatively insignificant changes in process rates or the nature of the stock may yield major changes in the rate or extent of foam formation. In phosphoric acid wet processes, foam formation is drastically influenced by the phosphate: organic content of the phosphate rock, the size of the rock particles being processed, the digestion rate, reaction temperatures, throughput rates, and the like. As a consequence of such fluctuations a process day may include intervals in which antifoam feed is terminated, and periods in which actual bucket brigades are employed to dispense to the reaction medium a quantity of antifoam agent adequate to quell the foam formation which is experienced.

While it is possible to resort to the constant feed of a quantity of antifoam agent calculated to combat the maximum foam forming tendencies predictable for the process being treated, it is grossly uneconomical to continually feed a quantity which is actually required only during infrequent periods of gross foam occurrence. Conversely, when lesser quantities of antifoam agent are continually fed, the quantity of foam to be dispelled may have exceeded the foam quelling capacity of the antifoam agent in any quantity, by the time that the foam formation is noticed. In this regard, it must be noted that the efficiency of any antifoam agent is dependent both upon its ratio in relation to the quantity of foam formed, and the time which is required for the realization of the foam quelling effect. In the case of sudden foam surges, even massive quantities of antifoam agent may not yield the desired effect before overflow, pump binding, etc., are experienced. In addition, the quantity of antifoam agent required to deal with foam surges may be in excess of the capacity of the pump or dispensing system employed to feed the agent to the process being treated. Furthermore, foam surges may result in the overflow of the foam which is formed to downstream lines or vessels which are not normally treated with an antifoam agent. In such instances, there is an obvious and unavoidable lag between the time of introduction of the antifoam agent to the first reaction vessel, and its travel to downstream sites of foam occurrence. Such lags may result in damage to personnel or equipment by overflow, or the necessity for process shut down.

Accordingly, it may be seen that the use of antifoam agents in the treatment of process liquids which experience foam surges or the nonuniform occurrence of foam is frequently attended by inefficiency in the form of periodic terminations of the process or reductions in the process rate, which are necessitated or caused by foam formation, threatened damage to personnel or equipment as the result of foam overflow, pump-binding, etc., and economic losses resulting from the necessity for feeding a quantity of antifoam agent in excess of that required to combat foam experienced under normal conditions.

It is an object of the present invention to provide methods for the treatment of processes involving foam producing liquids with antifoam agents, in which the antifoam agents may be economically employed in a system capable of efficiently dealing with foam surges which may occur during such processes.

Another object is the provision of methods for sensing varying degrees of foam formation and progressively increasing the feed of antifoam agent, in response and in proportion, to the degree of such sensings.

An additional object is the provision of apparatus suitable for the execution of the methods of the foregoing objects. These and other objects of the invention will be made apparent by an examination of the specifications and claims in conjunction with the attached drawing which depicts a diagrammatic cross-sectional side view of a phosphoric acid wet process employing the inventive methods and apparatus.

In the copending application Ser. No. 539,085, filed on Mar. 31, 1966, the applicants have disclosed and taught methods and apparatus for controlling the occurrence of foam during the processing of liquids in which a supply of antifoam agent adequate to counteract the maximum foam forming potential of the liquid being treated, is continuously fed to the distribution system. Sensing means located in proximity to the level of the liquid to be treated are employed to release increments of the antifoam agent from the distribution system in proportion to the amount of foam which occurs and is sensed, and the remainder of the antifoam agent is recycled to the original source of supply and storage. The preferred means for accomplishing the objectives of the copending application comprise a pressurized system in which the antifoam agent is pumped under pressure to a distributing header containing a plurality of feeders provided with valves which are opened by the foam sensing elements upon contact with the foam. Due to the fact that the quantity of antifoam agent dispensed by the feeders is subject to variation, and because of the necessity for maintaining and pumping within the distribution system a quantity of antifoam adequate to satisfy maximum demands, a relief valve and return cycle are employed to permit the return of that quantity of antifoam agent which is in excess of the quantity being currently dispensed to the feeders, to the original supply source of the antifoam agent.

While the method and apparatus provided by the copending application represent satisfactory solutions of the problem to which they are dedicated, it has been found that alternate means of accomplishing these same objectives are provided by the methods and apparatus of the present invention.

Specifically, a quantity of antifoam agent adequate to counteract the maximum foam forming potential of the liquid being treated, is continuously fed to a holding tank located at an elevation above the surface level of the liquid being treated. From the bottom portion of the holding tank, the antifoam agent is flowed by gravity to a distributing header which is provided with a plurality of feeders. Each feeder is provided with a valve connected to a sensing element located in proximity to the surface of the liquid being treated and the valve is actuated to an open position upon the contact of foam with the sensing element. In order to increase the amount of antifoam agent being fed in response to increases in the amount of foam which is formed, the sensing elements for the valves of the feeders are located at progressively increased distances from the surface of the liquid being treated. Since the holding tank, distributing header and feeders are located at elevations above the surface level of the liquid being treated, the system may be operated solely by the feed of antifoam agent to the holding tank. The head provided by the antifoam agent within the holding tank makes possible the gravity flow of the antifoam agent to the distributing header, and in turn the feeders, and ultimately to the liquid being treated whenever the valves of one or more of the feeders is opened in response to the occurrence of foam. Since it is desirable to continuously feed the antifoam agent to the holding tank, means for the removal of that quantity of antifoam agent in excess of the quantity required for counteracting the maximum foam forming potential of the liquid being treated, are provided. In a simple and most desirable form, this requirement is satisfied by overflow means located in the upper portion of the holding tank, and above the level of the connection of the distributing header to the lower portion of the holding tank. By adjusting the distance between the level of the connection to the means for removing surplus antifoam agent, and the level of the connection to the distributing header, in relation to the diameter of the holding tank, a head adequate to provide the desired gravity flow and the quantity of antifoam agent required to deal with the maximum foam forming potential of the liquid being treated, may be achieved. Naturally, such adjustments must also take into consideration such factors as the height of the holding tank, distributing header and feeders in relation to the surface level of the liquid being treated, and to one another, the flow permitted by the diameter of the distributing header, feeders, valves in the feeders, etc.

The methods and apparatus of the invention may best be considered in conjunction with the attached drawings.

The drawing diagrammatically depicts the use of the methods and apparatus of the invention in conjunction with a representative wet process for the synthesis of phosphoric acid. The synthesis shown is merely representative of a variety of such processes in which the size and nature of the reaction vessels, their physical relationship to one another, and the like, may be highly varied without diminishing or obviating the suitability and general applicability of the inventive methods and apparatus. In the process shown, a mineral acid is withdrawn from storage and continuously added to the primary reactor 10 through a conduit 11. At the same time, phosphate rock which is not shown is added to the mineral acid to provide the reaction medium 12. Due to the continuous addition of the acid and phosphate rock, the volume of the reaction medium 12 is constantly increased to result in a constant overflow through the transfer conduit 13 to downstream reactor 14. While the system is depicted with only a primary reactor 10 and one downstream reaction 14, it must be realized that such processes may employ several reactors engaged in the same or different functions, e.g. digestion, concentration, refining, separation, etc. In addition, the reaction medium 12 may be recirculated from the downstream reactor 14 to the primary reactor 10, or intermediate reactors, with or without intermediate processing. During the course of such processing, foam is commnly formed upon the surface 15 of the reaction medium 12, and may overflow, or be originally formed, upon the surface 16 of downstream reactors such as 14.

In the practice of the invention, an antifoam agent 20 is transferred from a storage container 21 to a holding receptable 22, which is located at an elevation above the surfaces 15 and 16 of the reaction medium 12 in the primary reactor 10 and the downstream reactor 14, by means of a pump 23. A return line 24 is positioned in the wall 25 of the holding receptable 22 at a distance above the floor 26 of the holding receptable 22 which is gauged to permit the retention of the desired quantity of antifoam agent 20 within the holding receptable 22 and permit the overflow of any amount in excess of that quantity through the open end 27 of the return line 24, and back to the storage container 21. As a consequence, a quantity or head of the antifoam agent 20 is constantly maintained within the holding receptacle 22.

The holding receptacle 22 is also provided with one or more outlets 30 which connect with a distributing header 31. A gravity flow of the antifoam agent 20 from the holding receptacle 22 to the distributing header 31 is consequently realized. The distributing header 31 is further provided with a plurality of feeders 32, 33 and 34. In a preferred embodiment of the invention, a constant feeder 32, a plurality of responsive feeders 33, and one or more downstream feeders 34, are employed. The exit ends 35 of all of the feeders 32, 33 and 34 are positioned in a manner which permits the further gravity flow of the antifoam agent 20 from the distributing header 31 to the reaction medium 12 in the primary and downstream reactors 10 and 14.

In the preferred embodiment shown by the drawing, the constant feeder 32 is provided with an adjustable flow control valve 40 which may be adjusted to provide a constant flow of antifoam agent 20 to the reaction medium 12. While the flow control valve 40 may be completely shut, it is often desirable to maintain a constant flow of the antifoam agent 20 since the existence of a residual quantity of antifoam agent 20 within the reaction medium 12 will moderate the foam combatting effect which is required during sudden surges of foam formation.

When such surges of foam formation are experienced, the responsive feeders 33 are brought into play. These responsive feeders 33 which are also equipped with an adjustable flow control valve 40, are provided with a solenoid valve 41. As a consequence, the flow of antifoam agent 20 through the responsive feeders 33, and to the reaction medium 12, is controlled in respect to occurrence by means of the solenoid valves 41, and in respect to quantity by means of the adjustable flow control valves 40. The flow control valve is adjusted to provide the desired flow of antifoam agent 20 whenever the solenoid valve 41 is opened. As a consequence, a two position solenoid valve 41, i.e. fully shut and fully open, may be employed. It should be noted that the preferred combination of an adjustable flow control valve 40 and a solenoid valve 41, may be replaced by an adjustable solenoid valve. In such case the adjustment provided by the flow control valve 40 is embodied in the adjustable solenoid valve.

The adjustment of the flow control valves 40 of both the constant feeder 32 and the responsive feeders 33 is important, and must be based upon the foam forming characteristics of the particular system or reaction medium 12 which is to be treated. Generally, the constant feeder 32 is adjusted by means of the flow control valve 40 to add that quantity of antifoam agent 20 to the reaction medium 12, which is required to combat the frequent but minor occurrences of foam. The responsive feeders 33 are then adjusted to deal progressively with all foam occurrences in excess of those frequent but minor occurrences. As will be subsequently described in detail, the operation of these responsive feeders 33 is initiated by the occurrence of predetermined quantities of foam. Generally, the first responsive feeder 33 to be activated, is adjusted to provide a quantity of antifoam agent 20 which is adequate to deal with sudden but moderate surges of foam which slightly exceed the normal foam occurrence. One or more secondary responsive feeders 33 are then employed to combat greater foam surges and a final responsive feeder 33 is preferably employed to dispense a large quantity of antifoam agent 20 which is capable of dealing with massive foam surges in rarer emergency situations.

As previously noted, foam may also occur at downstream sites as the result of overflow, or the actual creation of foam at such sites. As shown by the drawing, the downstream reactor 14 has also been provided with a responsive feeder 34 which deals with foam experienced at that site.

The operation of the responsive and downstream feeders 33 and 34 is initiated by sensing-actuators 50. These sensing-actuators 50 are designed to open the solenoid valves 41 upon being contacted by foam and to close the solenoid valves 41 when the foam recedes. In order to achieve a feed of antifoam agent 20 which is proportionate to the quantity of foam experienced upon the surface 15 of the reaction medium 12, the sensing-actuators 50 are located at progressively increased distances from the surface 15 of the reaction medium 12. Accordingly, a constant flow of antifoam agent 20 from the constant feeder 32 is employed to deal with minor instances of foam occurrence. However, when foam formation exceeds the foam quelling effect of the quantity of antifoam agent 20 which is being continuously dispensed by the constant feeder 32, foam will occur upon the surface 15 of the reaction medium 12 and rise until it contacts the sensing-actuator 50 which is located in closest proximity to the surface 15 of the reaction medium 12. Thereupon, the sensing-actuator 50 which is contacted will actuate the solenoid valve 41 of the responsive feeder 33 which it controls to an open position, permit the flow of a quantity of antifoam agent 20 predetermined by the adjustment of the flow control valve 40 of that responsive feeder 33, and thereby increase the quantity of antifoam agent 20 in the reaction medium 12. In the event that the foam continues to rise despite the increased quantity of antifoam agent 20, it will continue to contact sensing-actuators 50 which are positioned at increased distances from the surface 15 to initiate the flow of additional quantities of antifoam agent 20 through the responsive feeders 33 which are controlled by these sensing-actuators 50. As previously noted, the flow control valve 40 of the responsive feeder 33 which is controlled by the sensing-actuator 50 which is positioned at the greatest distance from the surface 15 is preferably adjusted to provide a large flow of antifoam agent which is capable of dealing with massive or emergency foam conditions.

The sensing-actuator 50 depicted by the drawing, and preferred for use in the practice of the invention, is a coaxial capacitance probe. Upon being contacted by the foam, the coaxial capacitance probe opens the solenoid valve 41 to which it is linked. However, various other electrical or mechanical means may be employed as the sensing-actuators 50. For example, spaced electrodes may be utilized. In such case, the rising foam contacts the electrodes, provides a conductive bridge or link between the electrodes, and thereby completes a circuit which activates the solenoid valve 41 to an open position. Alternatively, the foam level may be sensed by light, e.g. a photocell, or by sonic means, which in turn actuate the solenoid valve. Similarly, a float arrangement may be employed as the sensing-actuator. In the latter case a float is located in proximity to the surface 15 of the reaction medium. Upon the elevation of the float by the buoying effect of the rising foam, the float arm may either trip a switch to which it is linked, or move to a position whereby two contacts are bridged to complete a circuit, and thereby activate the solenoid valve 41 to an open position. The valve is preferably spring loaded to return it to a closed position upon the cessation of the activating force. In the selection of probes, electrodes or floats, due consideration must be paid to the physical characteristics of the system to be treated. For example, the acidic nature of a phosphoric acid wet process renders the use of acid resistant equipment advisable. Similarly, the use of spaced electrodes as a sensing-actuator 50 in systems which are characterized by foam splattering, durable foam, or in paper or pulp systems in which the cellulose fibers may permanently bridge the spaced electrodes, may be impaired by these factors, or require the use of splash shields for the spaced electrodes. In view of these factors, a single coaxial capacitance probe is preferred as the sensing-actuator 50.

The drawing also depicts a responsive feeder 34 which supplies antifoam agent 20 to the downstream reactor 14, whenever the sensing-actuator 50 positioned above the surface 16 of the reaction medium 12 of the downstream reactor 14 is contacted by foam.

The drawing also shows a breather vent 51 which is preferably employed in conjunction with the holding tank 22. The breather vent 51 is preferably shielded to prevent the entrainment of foreign material in the anti-foam agent 20. The apertures 52 of the outlets 30 which are positioned in the floor 26 of the holding receptacle 22, and which permit the gravity flow of anti-foam agent 20 to the distributing header 31, may also be provided with screens or strainers to prevent the entrainment of sediment in the antifoam agent 20. Alternately, the outlets 30 may be connected to the wall 25 of the holding receptacle 22, at an elevation slightly above the zone of the antifoam agent 20 within the holding receptacle 22 at which sediment formation normally occurs.

It should also be noted that while the use of the distributing header 31 with two outlets 30 is preferred for the purpose of uniform gravity flow through the feeders 32, 33 and 34, a single-outlet 30 may be employed with one end of the distributing header 31 being capped, or alternately, the distributing header 31 may be discarded and the individual feeders 32, 33 and 34 may be directly connected to the floor 26 of the holding receptacle 22, or to the wall 25 of the holding receptacle 22 at an elevation below the elevation of the return line 24.

When the turbulence provided by the introduction of the antifoam agent 20 by the pump 23 and feed line 28, and the gravity flow of the antifoam agent 20 through the return line 24 and outlets 30, is inadequate to maintain the desired dispersion of the active ingredients of the antifoam agent 20, an agitator may be placed in the holding receptacle 22 and beneath the liquid level of the antifoam agent. When the holding receptacle 22 is placed in an area subject to varying conditions of temperature, heating means within the holding receptacle 22, or external thereto, may be utilized to achieve or maintain the desired temperature.

As previously referred to, the flow control valve 40 in the constant feeder 32 may be closed, or the constant feeder 32 entirely dispensed with, in the treatment of those systems in which frequent but minor foam occurrence is not experienced, and foam occurrence is limited to infrequent surges of foam occurrence. However, even in such instances it should be noted that the ability of the responsive feeders 33 or downstream feeders 34 to quickly and efficiently quell such foam surges, is greatly facilitated when a sub-operative quantity of the antifoam agent 20 is constantly maintained in the reaction medium 12.

To demonstrate the operation of the invention in respect to a specific process, i.e. a wet process for the synthesis of phosphoric acid, it was found that a particular system experienced frequent but minor foam occurrences which could be readily avoided when 30 cubic centimeters per minute of a tall oil antifoam agent were constantly fed to the reaction medium. It was also found that the system experienced infrequent spurts of foam formation in which large quantities fo foam were formed for short periods of time. Finally it was found that on rare occasions the system was capable of producing massive surges of foam which normally resulted in the overflow of foam to downstream reactors.

Accordingly, an inventive system such as that shown by the drawing was employed as follows.

The flow control valve 40 of the constant feeder 32 was adjusted to provide a constant flow of 30 cc. per minute of the antifoam agent 20 to the reaction medium 12. The sensing-actuator 50 for the first responsive feeder 33 was then positioned 3 inches from the surface 15 of the reaction medium 12 and the flow control valve 40 for that responsive feeder was adjusted to permit the flow of 20 cc. per minute of the antifoam agent 20 to the reaction medium 12 when the solenoid valve 41 was opened. The sensing-actuator 50 for the second responsive feeder 33 was then positioned 5 inches above the surface 15 and its flow was adjusted for an additional 20 cc. per minute. The sensing-actuator 50 for the third responsive feeder 33 was positioned 8 inches above the surface 15 and its flow was adjusted to 100 cc. per minute. The sensing-actuator 50 for the downstream feeder 34, was positioned 4 inches above the surface 16 and its flow was adjusted to 30 cc. per minute. With the described arrangement, minor but infrequent foam occurrences were prevented from occurring by means of the 30 cc. per minute of antifoam agent 20 which were constantly fed to the reaction medium 12 by the constant feeder 32. When the foam forming potential exceeded the foam quelling ability of the 30 cc. feed, foam arose to a height of 3 inches to actuate the first responsive feeder 33 and increase the quantity of antifoam agent 20 being fed to 50 cc. per minute. In those instances when this amount was still inadequate, the total quantity of antifoam agent 20 was increased to 70 cc. per minute when the foam rose to 5 inches and to 170 cc. per minute when the foam rose to 8 inches. In practice, an event recorder revealed that the first responsive feeder 33 was actuated several times during a normal day to combat moderate foam surges but that the second and third responsive feeders 33 were actuated infrequently. Accordingly, the second responsive feeder 33 was rendered inoperative, the sensing-actuator 50 for the first responsive feeder 33 was raised to a position 4 inches above the surface 15 and the sensing-actuator 50 for the third responsive feeder 33 was lowered to a position 6 inches above the surface 15. It was found that with these conditions the foam formed by the system could be prevented from overflowing without requiring frequent addition of the antifoam agent. The downstream feeder 34 was found to be actuated only when the third responsive feeder 33 was required since the overflow of appreciable quantities of the foam to the downstream reactor 14 was only experienced at such times.

In referring to the positioning of the sensing-actuators 50, it should be noted that the references to the distances above the surface indicate the height at which the foam serves to actuate the particular sensing-actuator 50. In the case of coaxial capacitance probes, the tip of the probe is preferably the active site. Accordingly, when foam contacts the tip of the probe, the solenoid valve is activated to an open position. It should also be noted that a single coaxial capacitance probe with a plurality of active sites linked to different solenoid valves in different feeders may also be employed. In such case, the spacing between the active sites determines the heighths of foam occurrence which will actuate the individual feeders.

In addition, in positioning the sensing-actuators 50, any fluctuations in the volume of the reaction medium 12, and consequently, in the elevation of the surface 15, must be considered. In many systems, this factor varies by only one or two inches due to the relatively fixed capacity of the process. However, in order to realize flexibility in respect to such variations, it is advisable to follow the subsequent procedure in positioning the sensing-actuators 50. First, the relative distance between the operative positions of the sensing-actuators 50 should be determined. Since this relative distance is predominantly dependent upon the foam forming potential of the reaction medium 12, irrespective of its volume, it will soon be determined that the sensing-actuator 50 for the second responsive feeder 33 should be positioned 3 inches above the sensing-actuator 50 for the first responsive feeder 33, the third should be 4 inches above the second, etc. Once these relative distances are determined, the sensing actuators may be permanently positioned in a suitable bracket 55 such as that shown by the drawing. For example, the probe for the first responsive feeder 33 may be positioned to protrude 20 inches beyond the bracket 55, the second probe may protrude 17 inches, and the third may protrude 13 inches.

When coaxial capacitance probes or spaced electrodes are employed as the sensing-actuator 50, care must be taken to insulate the probes or electrodes in respect to the bracket 55. Once this is accomplished, the bracket 55 with the fixed sensing-actuators 50 may be movably mounted in respect to the surface 15 with the bracket parallel thereto and the sensing-actuators 50 perpendicular to the surface 15 and the bracket 55.

Thereafter, the bracket 55 may be moved toward or away from the surface 15 in response to variations in the elevation of the surface 15 and thereby maintain the portions of the sensing-actuators which are in closest proximity to the surface at a constant distance from the surface 15 and in a fixed relationship to one another. The bracket 55 may be easily mounted by means of a thumb screw to an angle iron or similar support which is attached to the wall 56 of the primary reactor 12 in a perpendicular relationship with the surface 15 of the reaction medium.

In addition, the capacity of the pump 23 is preferably equal to or slightly in excess of, the total maximum flow capacity of all constant, responsive and downstream feeders 32, 33 and 34. For example, if the constant feeder 32 is adjusted by means of the flow control valve 40 to provide a flow of 50 cc. per minute and three responsive feeders 33 each adjusted to provide a flow of 30 cc. per minute are employed in combination with a downstream feeder 34 which flows an additional 40 cc. per minute, the system may disperse 180 cc. per minute when the solenoid valves 41 of all three responsive feeders 33 and the downstream feeder 34 are open. Consequently, a pump having a capacity of at least 180 cc. per minute would be advisable if a situation in which the feeders could not dispense the quantity desired is to be avoided. Similarly, the flow capacity of return line 24 is preferably equivalent to, or slightly in excess of, the capacity of the pump 23, minus any constant flow which may be dispensed through a constant feeder 32. If such conditions are observed, a relatively constant head of antifoam agent 20 may be maintained in the holding receptacle 22 and the extent of that head may be determined or adjusted by means of the elevation of the return line 24 in relation to the floor 26 of the holding receptacle 22.

The pump 23 employed in the practice of the invention may be any pump of suitable capacity, including piston, diaphragm and gear pumps.

The flow control valves 40 need not be adjustable if the feeders are initially designed to yield a predetermined desired flow, are modified in this respect by means bore reducers, or if the flow to the feeders 32, 33 and 34 and/or distributing header 31 is controlled by means of upstream valves, e.g. in the outlets 30, or the head of antifoam agent which is maintained in the holding receptacle 22. However, in order to render the system flexible in respect to variations in the foam forming potential of the process to be treated, as well as suitable for the treatment of other processes, the adjustable flow control valves 40 are preferred. The preferred adjustable flow control valve 40 may be any V, gate, throttle or needle valve of a suitable flow capacity or rating.

The solenoid valves 41 may be any conventional solenoid operated valve which is capable of being actuated by an electrical or radio signal emitted by the sensing-actuators 50. Such signal may be transferred from the sensing-actuator 50 to the solenoid valve 41 by means of physical circuitry or airborne radio waves. In the event of the physical actuation of the sensing-actuator 50, e.g. the physical displacement of a float, such physical displacement may either complete an electrical circuit, trigger a signal, or even displace the valve 41 if the float and the valve are physically linked.

It should be noted that while the disclosure of the invention throughout the specification has been predominantly associated with phosphoric acid wet processes, it is by no means so limited in respect to practical applications. This emphasis has resulted from the fact that such processes are highly representative of systems which experience nonuniform foam occurrence with a consequent necessity for correspondingly nonuniform rates in respect to the feeding of antifoam agents. Many other fluid systems, including the wet end of processes for the manufacture of pulp or paper, the processing of aluminum and clay slurries, etc., are similarly troubled and may be equally benefitted by the invention.

It is apparent that the present invention provides methods and apparatus which permit the greatly improved, efficient and economical use of antifoam agents in the treatment of liquids which are characterized by nonuniform foam characteristics, by means of the gravity flow of antifoam agents to feeders which are capable of actuation in response to foam occurrence and of dispensing quantities of antifoam agents in proportion to the extent of such occurrence. Such methods and apparatus are characterized by ease, simplicity, and economy of operation, adaptability to varying conditions, and economy in respect to the quantity of antifoam agent required for the effective treatment of foam.

It is obvious that various alterations, substitutions and modifications may be made in the invention methods and apparatus without departing from the spirit of the invention as defined by the following claims.

We claim:

1. A system for treating a process liquid with an antifoam agent, comprising a supply source for said antifoam agent, a holding receptacle located at an elevation above the surface level of said liquid and above said supply source, first conduit means connecting said supply source with said holding receptacle, pump means for transferring said antifoam agent from said supply source to said holding receptacle through said first conduit means, second conduit means connecting said supply source with said holding receptacle at the desired surface level of said antifoam agent contained by said holding receptacle, a plurality of feeders connected to said holding receptacle at a point below said desired liquid level, and a plurality of sensing means located at graduatedly increased heights from the surface of said liquid and responsive to the occurrence of foam at said heights to open valves in said feeders and initiate the gravity flow of said antifoam agent from said holding receptacle through said feeders to said liquid.

2. A system as claimed by claim 1 in which said feeders are connected to a distributing header which is in turn connected to said holding receptacle.

3. A system as claimed by claim 1 in which said feeders lead to different zones of said liquid.

4. A system as claimed by claim 1 in which said sensing means are coaxial capacitance probes.

5. A system as claimed by claim 1 in which said sensing means are a plurality of active sites located upon a coaxial capacitance probe.

6. A system as claimed by claim 5 in which said valves are solenoid valves.

7. A system as claimed by claim 1 in which said feeders also contain flow control valves.

8. A system as claimed by claim 1 in which a portion of said feeders are constantly open to permit the continuous flow of said antifoam agent to said liquid.

References Cited

UNITED STATES PATENTS

| | | | |
|---|---|---|---|
| 1,916,614 | 7/1933 | Harrison | 252—321 |
| 1,984,789 | 12/1934 | Everett | 252—321 |
| 2,883,344 | 4/1959 | McKinney | 252—321 |
| 3,306,341 | 2/1967 | Pugh et al. | 159—13 |

RICHARD D. LOVERING, *Primary Examiner.*

U.S. Cl. X.R.

23—165; 137—5, 170.2, 392; 252—321